United States Patent [19]

Min et al.

[11] Patent Number: 4,898,787
[45] Date of Patent: Feb. 6, 1990

[54] EMULSION POLYMERIZED COHESIVE POLYMER LATEX USEFUL AS COLD SEAL COATING AND IMPROVED SEALABLE ARTICLES TREATED WITH THE SAME

[75] Inventors: Taeik Min, Pittsford; Robert E. Touhsaent, Fairport, both of N.Y.

[73] Assignee: Mobil Oil Corporation, New York, N.Y.

[21] Appl. No.: 187,303

[22] Filed: Apr. 28, 1988

Related U.S. Application Data

[63] Continuation-in-part of Ser. No. 69,049, Jul. 2, 1987, abandoned.

[51] Int. Cl.$^4$ .............................................. B32B 27/06
[52] U.S. Cl. ........................................ 428/480; 428/481; 428/482; 428/483
[58] Field of Search ................ 524/832, 833; 428/480, 428/481, 482, 483

[56] References Cited

U.S. PATENT DOCUMENTS

| | | | |
|---|---|---|---|
| 2,757,106 | 7/1956 | Brown et al. | 524/833 |
| 2,778,283 | 1/1957 | Bettoli et al. | 524/833 |
| 2,868,748 | 1/1959 | Frazier et al. | 524/833 |
| 2,962,465 | 11/1960 | Lindstrom et al. | 524/833 |
| 3,242,121 | 3/1966 | Hill | 524/833 |
| 3,458,466 | 7/1969 | Lee | 524/833 |
| 3,547,847 | 12/1970 | Levine et al. | 524/833 |
| 3,696,082 | 10/1972 | Smith | 260/80.8 |
| 3,753,940 | 8/1973 | Trofimow et al. | 524/833 |
| 3,919,156 | 11/1975 | Khanna et al. | 524/833 |
| 4,031,053 | 6/1977 | Bunkley et al. | 524/833 |
| 4,056,503 | 11/1977 | Powanda | 524/833 |
| 4,089,828 | 5/1978 | Vasishth et al. | 524/833 |
| 4,113,540 | 9/1978 | Patella et al. | 524/833 |
| 4,151,146 | 4/1979 | Patella | 524/833 |
| 4,151,147 | 4/1979 | Neuschwanter et al. | 524/833 |
| 4,176,108 | 11/1979 | Caimi et al. | 524/833 |
| 4,234,467 | 11/1980 | Ryrfors et al. | 524/833 |
| 4,296,013 | 10/1981 | Gibbs | 524/833 |
| 4,316,830 | 2/1982 | Mallon | 524/833 |
| 4,336,172 | 6/1982 | Maquardt et al. | 524/833 |
| 4,341,679 | 7/1982 | Burgess et al. | 524/833 |
| 4,350,622 | 9/1982 | Hiyoshi et al. | 524/833 |
| 4,356,229 | 10/1982 | Brodnyan et al. | 524/833 |
| 4,403,464 | 9/1983 | Duncan | 428/35 X |
| 4,456,741 | 6/1984 | Ames | 428/355 X |
| 4,500,683 | 2/1985 | Hori et al. | 524/533 |
| 4,599,378 | 7/1986 | Hausman et al. | 524/833 |

FOREIGN PATENT DOCUMENTS

| | | | |
|---|---|---|---|
| 0240821 | 12/1959 | Australia | 524/833 |
| 0766431 | 10/1971 | Belgium | 524/833 |
| 0728229 | 2/1966 | Canada | 524/833 |
| 0815089 | 6/1969 | Canada | 524/832 |
| 1151661 | 6/1963 | Fed. Rep. of Germany | 524/833 |
| 3344354 | 6/1985 | Fed. Rep. of Germany | 524/833 |
| 146604 | 1/1979 | German Democratic Rep. | |
| 0019392 | 6/1973 | Japan | 524/833 |
| 0034631 | 4/1975 | Japan | 524/832 |
| 0090562 | 7/1980 | Japan | 524/833 |
| 0111368 | 7/1982 | Japan | 524/832 |
| 00600171 | 4/1985 | Japan | 524/833 |
| 0137906 | 7/1985 | Japan | 524/833 |
| 1043607 | 3/1986 | Japan | 524/833 |
| 7307894 | 12/1973 | Netherlands | 524/833 |
| 0808730 | 2/1959 | United Kingdom | 524/832 |
| 1015874 | 1/1966 | United Kingdom | 524/833 |
| 2070037 | 9/1981 | United Kingdom | 524/833 |

Primary Examiner—Joseph L. Schofer
Assistant Examiner—J. M. Reddick
Attorney, Agent, or Firm—Alexander J. McKillop; Charles J. Speciale

[57] ABSTRACT

A cold sealable emulsion polymerized terpolymer cohesive formulation which has low surface tack characteristics, prepared from the emulsion polymerization of a first monomer selected from the group consisting of ethyl acrylate, hexyl acrylate, isooctyl acrylate, butyl acrylate, methyl acrylate and vinylidene chloride, a second monomer selected from the group consisting of vinyl acetate, methyl methacrylate, styrene, ethyl methacrylate and isobutyl methacrylate and a third monomer selected from the group consisting of methacrylic acid, acrylic acid, itaconic acid, sulfoethyl methacrylate and malic acid with the proviso that each of said first, second and third monomers are different.

16 Claims, No Drawings

EMULSION POLYMERIZED COHESIVE POLYMER LATEX USEFUL AS COLD SEAL COATING AND IMPROVED SEALABLE ARTICLES TREATED WITH THE SAME

This is a continuation-in-part of copending U.S. patent application Ser. No. 069,049, filed by the inventors herein on July 2, 1987 now abandoned.

BACKGROUND OF THE INVENTION

1. Field of the Invention

This invention relates to a cold sealable emulsion polymer cohesive composition which is low in surface tack, and to cold sealable articles, particularly packaging film treated with the same.

2. Background of the Related Art

In the past, in the preparation of films useful for packaging purposes, heat sealable coatings, such as acrylic coatings, were coated on one side of the film substrate and another heat sealable coating, such as polyvinylidene chloride (PVDC) was coated on the other side. The acrylic coated side was generally the outside of the web, the side in direct contact with the hot sealer surfaces, where good hot slip and jaw release characteristics are required. The PVDC coating was usually on the inside of the web and provided the high seal strength, good hot tack characteristics and barrier properties required for such packaging. These heat sealable coatings have glass transition temperatures ("Tg"s) which are higher than room temperature. Such a coated film is disclosed in U.S. Pat. No. 4,403,464.

Similarly, U.S. Pat. No. 4,456,741 discloses heat sealable terpolymer compositions useful as pressure-sensitive adhesives for application with, for example, backing materials including paper, polyester film and foamed polymers. The terpolymer heat sealable pressure-sensitive adhesive composition comprises butyl acrylate, N-vinyl-2-pyrrolidinone and styrene. Other heat sealable coatings are disclosed in U.S. Pat. No. 3,696,082; and East German Patent No. DD-146,604.

In packaging products which are sensitive to heat, such as candies, chocolates, ice cream and the like, in plastic film or paper packages, the use of heated elements must be avoided in order to prevent melting of the products. Therefore, the use of heat sealable coatings to seal the packages has presented serious difficulties in packaging the product, often requiring the isolation of the product from the heated elements. Accordingly, cold sealable pressure-sensitive adhesives were developed which did not require the use of a heated element to seal the packages. Unfortunately, these adhesives had high surface tack characteristics which made them adhere to uncoated surfaces of the packaging film, making these adhesives difficult to use due to the resulting blocking (i.e. sticking) of the film.

Findley 207-939, a polyisoprene adhesive manufactured by Findley Adhesive, Inc., is a cold sealable pressure-sensitive adhesive coating which exhibits good crimp seal strength on oriented polypropylene film and has a Tg of $-1.6°$ C. This adhesive has a high surface tack which often results in blocking of the packaging film.

Another such pressure-sensitive adhesive composition is disclosed in U.S. Pat. No. 4,500,683. The pressure sensitive adhesives of this patent contain as a polymer component an addition polymerization polymer of an acrylate or methacrylate polymer and one or more ethylenically unsaturated monomers capable of forming homo- or copolymers having a glass transition temperature of at least 273° k. This composition forms a viscous adhesive composition which is tacky at room temperature, thus presenting the blocking problems when used on packaging films.

Thus, the related art has disclosed heat sealable coatings and pressure-sensitive, tacky, cold sealable adhesives useful in the packaging art. The related art has not, however, disclosed or provided a cold sealable, pressure-sensitive cohesive, rather than adhesive formulation which similarly to the above described heat sealable, pressure-sensitive coatings, has low surface tack and is cohesive only when placed under pressure in contact with other cold sealable cohesive coated surfaces.

Accordingly, it is an object of the present invention to provide a coal sealable, emulsion polymerized terpolymer cohesive formulation which is cohesive to similarly coated film or paper substrates, rather than being tacky and adherent to non-coated surfaces.

Another object of the present invention is to provide a cold sealable cohesive formulation having the unique improved combination of properties, e.g., low surface tack, good coating uniformity, high seal strength and wetting ability, on substrates such as plastic and paper film.

Still a further object of the invention is to provide a cold sealable, emulsion polymer cohesive formulation which, when coated on a film or paper substrate, imparts high cold seal strength, i.e., bonding under only pressure, even at low coating weight and also improved surface properties, e.g., low surface tack and excellent coating uniformity.

Still another object of the present invention is to provide improved packaging film or paper coated with a cold sealable cohesive formulation having a smooth, non-tacky surface which will not block at room temperature.

A further object of the invention is to provide improved coated packaging film having high cold seal strength.

SUMMARY OF THE INVENTION

These and other objects are achieved according to the present invention by providing an emulsion polymer, cold sealable, cohesive composition prepared from the emulsion polymerization of a first monomer selected from the group consisting of ethyl acrylate, hexyl acrylate, isooctyl acrylate, butyl acrylate, methyl acrylate, vinylidene chloride and mixtures thereof; a second monomer selected from the group consisting of vinyl acetate, methyl methacrylate, styrene, ethyl methacrylate, isobutyl methacrylate and mixtures thereof; and, a third monomer selected from the group consisting of methacrylic acid, acrylic acid, itaconic acid, sulfoethyl methacrylate, maleic acid and mixtures thereof with the proviso that each of said first, second and third monomers are different.

The resulting latex formulation adheres, when wet, to packaging film substrates, such as oriented polypropylene ("OPP") or paper. Once solidified by drying, the coated surface is cohesive at room temperature and under pressure only to other similarly coated surfaces. The coated surface does not adhere to non-coated film surfaces, and thus presents a smooth, non-tacky surface which will not block or stick under normal operating conditions.

DETAILED DESCRIPTION OF THE INVENTION

The emulsion polymerized cold sealable polymer formulations of the present invention are prepared by a two-stage emulsion polymerization process. The first stage of polymerization, which may be referred to as the seed latex, is carried out, for example with about 5% to about 30% by weight of the total monomer feed, preferably about 10% of the total monomer feed. The second stage of polymerization is carried out with the remaining 90% by weight of the monomer feed. Each stage of the polymerization is carried out in the presence of water, an emulsifying agent and a free radical catalyst. Typical free radical catalysts include hydrogen peroxide, ammonium or potassium persulfate or a redox type, such as mixtures of persulfates with alkali metal bisulfites, thiosulfates or hydrosulfites. Generally, the total amount of catalyst employed is in the range of from about 0.5% by weight to about 5% by weight based on the total weight of the monomer. Each stage of the emulsion polymerization is typically carried out in the presence of one or more anionic, nonionic or cationic emulsifiers such as, for example, the alkyl carboxylic acid salts, phosphoric acid salts, the alkyl sulfate salts, the alkyl sulfonate salts, the alkyl aryl ether alcohols and the alkyl aryl polyether sulfate salts. Generally, the total amount of emulsifier employed is from about 0.01 to about 1.0 percent by weight based on the total amount of water.

A chain transfer agent, such as, isooctyl thioglycolate, may also be employed in the emulsion polymerization process herein. Generally, the chain transfer agent is utilized in amounts ranging from about 0.1 to about 0.9% by weight based on the weight of total monomer.

In general, the first stage of the polymerization is carried out at a temperature of from about 40° to about 90° C., preferably about 80° C., at a pressure in the range of from about 0 to about 20 psig, preferably about 10 psig. This stage may or may not be carried out in the presence of an insert gas, such as nitrogen. The first stage polymerization is generally carried out for a time of from about 0.5 to about 3 hours, preferably about 1 hour.

The second stage polymerization is generally performed under the same temperature and pressure conditions as in the first stage. Typically, the remaining amount of monomer feed is gradually fed to the second stage over a period of from about 2 to about 5 hours. The total reaction time of the second stage, however, is usually from about 4 to about 6 hours.

In accordance with the present invention, the terpolymers prepared from the above described two stage emulsion polymerization process are prepared from a monomer feed comprised of a first monomer selected from the group consisting of ethyl acrylate, hexyl acrylate, isooctyl acrylate, butyl acrylate, methyl acrylate, vinylidene chloride and mixtures thereof; a second monomer selected from the group consisting of vinyl acetate, methyl methacrylate, styrene, ethyl methacrylate, isobutyl methacrylate and mixtures thereof; and, a third monomer selected from the group consisting of methacrylic acid, acrylic acid, itaconic acid, sulfoethyl methacrylate, maleic acid and mixtures thereof.

The glass transition temperatures of homopolymers from these monomeric constituents are listed in Table 1.

TABLE 1

|  | Homopolymer Tg's Tg (°C.) |
|---|---|
| First Monomer Group | |
| Ethyl acrylate | −22 |
| Hexyl acrylate | −57 |
| Isopropyl acrylate | −3 |
| Butyl acrylate | −54 |
| Methyl acrylate | 8 |
| Vinylidene chloride | −17 |
| Second Monomer Group | |
| Vinyl acetate | 32 |
| Methyl methacrylate | 105 |
| Styrene | 100 |
| Ethyl methacrylate | 65 |
| Isobutyl methacrylate | 48 |
| Third Monomer Group | |
| Acrylic acid | 106 |
| Methacrylic acid | 185 |
| Itaconic acid | — |
| Sulfoethyl methacrylate | — |
| Maleic acid | — |

In general, the terpolymers of the present invention are prepared from and contain about 40 to about 75 weight percent, preferably 60 to 70 weight percent, of the aforementioned first monomer, such as ethyl acrylate, from about 15 to about 50 weight percent, preferably 25 to 35 weight percent, of the aforementioned second monomer, such as vinyl acetate, and from about 0.1 to about 10 weight percent, preferably 1 to 5 weight percent, of the aforementioned third monomer, such as methacrylic acid, all ratios are based on the total monomer weight. Optionally if desired a small amount, preferably less than 0.5% by weight, of a multifunctional monomer, such as, for example, ethyleneglycol dimethylacrylate, may be added to either stage of the emulsion polymerization process, preferably the second stage, to provide some crosslinking and increase the sealing strength (crimp strength) of the polymer without affecting the glass transition temperature ("Tg") and the tackiness of the terpolymer.

The emulsion polymers of the present invention have an average molecular weight of from about 20,000 to about 150,000, preferably from about 50,000 to about 90,000 as determined by gel permeation chromatography (GPC) and have a Tg of from about −15° to about 15° C., preferably from about −10° C. to about 10° C. The diameter of the terpolymer particles are generally in the range of from about 0.05 to about 0.3 microns.

The glass transition temperature ("Tg") of the polymer formulation is inversely related to the tackiness of the coating. So that when the Tg of the polymer decreases, the tackiness increases. Tg of the terpolymer is related to the ratios of the weight fractions of the monomeric components and the Tg's of these components, so that when a terpolymer is being analyzed, $$\frac{1}{T_g} = \frac{W_{f1}}{T_{g1}} + \frac{W_{f2}}{T_{g2}} + \frac{W_{f3}}{T_{g3}}$$

where:
$T_g$ = the Tg of the terpolymer;
$T_{g1}$ = the Tg of the first monomer;
$T_{g2}$ = the Tg of the second monomer;
$T_{g3}$ = the Tg of the third monomer;
$W_{f1}$ = the weight fraction of the first monomer;
$W_{f2}$ = the weight fraction of the second monomer; and, $W_{\beta}$ = the weight fraction of the third monomer.

Thus, Table 2 examines the theoretically calculated values for Tg, comparative surface tack ("ST") and crimp seal strength ("Cs") of OPP film coated with one preferred combination of monomeric components. The first monomeric component being ethyl acrylate ("EA"), the second being vinyl acetate ("VAC"), and the third being methacrylic acid ("MAA"). In addition, Table 2 compares the theoretically calculated properties of an OPP film coated with this preferred terpolymer composition falling within the preferred range of proportions of monomeric components, to the theoretically calculated values for an OPP film coated with the terpolymer having various other proportions of those monomeric components falling outside of the preferred range.

TABLE 2

|  | Component Composition % by Weight | | | Properties (Theoretically calculated values) | | |
| --- | --- | --- | --- | --- | --- | --- |
|  | EA | VAC | MAA | Tg (°C.) | ST | CS (g/in) |
| Preferred range | 60–70 | 25–35 | 1–5 | −10 to 10 | very low | >438 (high) |
|  | 67 | 30 | 3 | −4.2 | low | high |
|  | 67 | 32 | 1 | −5.6 | low | high |
|  | 70 | 27 | 3 | −5.6 | low | slightly less |
| Acceptable range | 40–75 | 15–50 | .1–10 | −15 to 15 | | |
|  | 60 | 37 | 3 | −0.5 | low | less |
|  | 60 | 30 | 10 | 5.4 | very low | less |
|  | 67 | 29.9 | 0.1 | 0.7 | low | low |
|  | 67 | 29.99 | 0.01 | 0.8 | low | low |
|  | 75 | 15 | 10 | −2.7 | low | high |
| Below acceptable range | 30 | 67 | 3 | 16.2 | very low | non sealable |
|  | 20 | 77 | 3 | 22.3 | very low | non sealable |
|  | 30 | 60 | 10 | 22.6 | very low | non-sealable |
|  | 80 | 17 | 3 | −10.5 | tacky | barely sealable |
|  | 80 | 10 | 10 | −5.3 | Less tacky | high |

The resulting latex formulation adheres, when wet, to packaging film substrates, such as oriented polypropylene ("OPP") or paper. Once solidified by drying, the coated surface does not adhere to non-coated film surfaces, and thus presents a smooth, non-tacky surface which will not block or stick under normal operating conditions. However, if similarly coated surfaces are placed in contact with each other and under pressure, at about room temperature or below, then the coated surfaces become cohesive forming a strong bond between each other.

Thus, the emulsion polymer formulations of the present invention are very useful in imparting high cold seal bond strength to packaging paper or packaging film substrates, particularly polyolefin film, such as polypropylene film substrates. Substrates which are particularly contemplated for use with the cold sealable polymer formulations of the present invention include cast or oriented polypropylene, coextruded films, nylon, white opaque film, cellophane, paper, polyesters, high density polyethylene and linear low density polyethylene. It is also contemplated herein that the substrates may be uncoated or coated, such as with polyvinylidene chloride or primer and/or may be pre-treated, such as with corona discharge, flame or plasma. It has been found herein, and as will be substantiated by the data hereinafter, that the cohesive terpolymer formulations of the present invention, when coated on packaging film, such as polyolefin film, impart high cold seal strength, (bonding using only pressure) against the same coated side, with good coating uniformity and low tack, even at low coating weights.

Commonly known techniques can be employed to apply the emulsion polymer formulation of the present invention to the film or paper substrate. For example, when impregnating or saturating the substrate, it may be dipped or sprayed. If the substrate is coated, this may be accomplished by dipping, spraying or by employing a roller, spreading knife, brush or the like. Generally, the emulsion polymer formulation is applied in an amount of from about 1 lb./3000 sq. ft. to about 5 lbs./3000 sq. ft. to the film substrate.

The emulsion polymerization formulation of the present invention may be compounded with, or have mixed therein, other known ingredients or stabilizers, antifoaming agents, dying adjuvants, pigments, waxes, corn starch, silica, talc and the like or other compounding aids to control surface tack and other surface properties. Thickeners or bodying agents may be added to the polymers so as to control the viscosity of the polymer and thereby achieve the proper flow properties for the particular application desired.

The following examples are illustrative of the invention.

EXAMPLE 1

This example illustrates the preparation of an emulsion polymerized, cold sealable, terpolymer formulation within the scope of the invention.

Using a semi-continuous batch process, a seed latex was prepared by continuously adding and metering 10% by weight of premixed total monomer feed to a reactor containing 100 parts by weight water, 0.05 parts by weight 10% phosphoric sodium salt solution (sodium Gafac, GAF Corporation), 0.025 parts by weight 10% ammonium persulfate solution and 0.004 parts by weight isooctyl thioglycolate, as a chain transfer agent, (all parts by weight based on 100 parts by weight water). The premixed total monomer feed is comprised of 67 parts by weight ethyl acrylate, 30 parts by weight vinyl acetate and 3 parts by weight methacrylic acid, based on 100 parts by weight total monomer. Then, 10% by weight of this premixed monomer was added to the reactor over a period of 30 minutes. The emulsion polymerization reaction was maintained isothermally at 80° ± 2° C. and the pressure was maintained at about 10 psig with inert nitrogen gas. Sufficient agitation was used to uniformly disperse the monomers in the reactor. The reactor batch was held for about 15 minutes after the addition of 10% premixed monomers.

The second stage of polymerization was subsequently carried out by the same semi-continuous batch process wherein the residual premixed monomer (i.e., remaining 90% by weight of the total monomer feed) was added.

stage emulsion polymerization process of the present invention was pattern applied by roller to the sealable portions of one side of a polyvinylidene chloride coated oriented polypropylene film and dried at an oven temperature of 210° F. The properties of the coated film were tested and the results of the testing, in comparison with a commercially available cold sealable adhesive, are summarized in Table 4.

TABLE 4

| | Results On Cold Seal Coatings | | | | | |
|---|---|---|---|---|---|---|
| Adhesive | Chemical Composition | Tg (°C.) | Crimp Seal (H-Ct Wt) | (g/in) L-Ct Wt) | Coating Uniformity | Surface Tack |
| Two-Stage Emulsion polymerized polymer of the present invention | EA/VAc/MAA | −0.4 | 578 | 438 | Very good | Very Low |
| Adhesive supplied by Findley Adhesive, Inc. | Polyisoprene | −1.6 | 671 | 165 | Good to Fair | High |

| Base Film: | PVDC Coated oriented polypropylene film |
|---|---|
| Crimp: | 80 psi, ½sec., room temp. |
| High-Coating (H-Ct) Wt: | 4.1 lb/3000 ft² |
| Low-Coating (L-Ct) Wt: | 0.99 lb/3000 ft² |

EA = ethyl acrylate
VAc = vinyl acetate
MAA = methacrylic acid

Prior to commencing the second stage, 4.9 additional parts by weight of 10% phosphoric sodium salt solution (sodium Gafac, GAF Corporation) was added to the reactor. The second stage of monomer feeding was started when the polymerization temperature was raised to 80° C. The monomer metering cycle was 3 hours for the second stage of polymerization. The temperature and pressure were the same as the first stage. After completing the addition of all of the monomer feed, the reactor batch was held for 30 minutes.

For latex stability, a small additional amount of 10% phosphoric sodium salt solution and aqueous ammonia solution were added to the reactor. The latex was subsequently cooled and filtered through a 25 micron filter. The latex stability of the resultant EA/VAC/MAA terpolymer was excellent. The terpolymer has the structure:

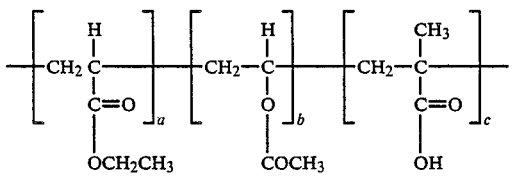

The properties of the terpolymer latex prepared by Example 1 are summarized in Table 3 below:

TABLE 3

| Characteristics of EA/VAC/MAA Terpolymer Latex | |
|---|---|
| | Latex |
| Total Solids (%) | 43.0 |
| Particle Size (nm) | 102 |
| pH | 6.5 |
| Surface Tension (dynes/cm) | 48.3 |
| Mw × 10³ | 73 |
| Mn × 10³ | 35 |
| Tg (°C.) (measured) | 4.1 |

EXAMPLE 2

An ethyl acrylate-vinyl acetate-methacrylic acid terpolymer latex prepared in accordance with the two- Obviously, other modifications and variations of the present invention are possible in light of the above teachings. It is, therefore, to be understood that changes may be made in the particular embodiments of this invention which are within the full intended scope of the invention as defined by the appended claims.

We claim:

1. A coated or impregnated substrate which includes a cold sealable, emulsion polymerized cohesive terpolymer composition for coating or impregnating said substrate, said terpolymer consisting of:

(a) from about 40 to about 75 percent by weight of a first monomer comprising ethyl acrylate;

(b) from about 15 to about 50 percent by weight of a second monomer comprising vinyl acetate; and, (c) from about 0.1 to about 10 percent by weight of a third monomer comprising methacrylic acid, whereby said terpolymer coated or impregnated substrate having low tack characteristics, high crimp strength and is cohesive only to substrates which are coated or impregnated with said terpolymer when cold sealed under pressure.

2. The coated or impregnated substrate of claim 1, wherein said terpolymer has an average molecular weight of from about 20,000 to about 150,000 and a glass transition temperature in the range of from about −15° C. to about 15° C.

3. The coated or impregnated substrate of claim 2, wherein said first monomer comprises from about 60 to about 70 percent by weight of said terpolymer, said second monomer comprises from about 25 to about 35 percent by weight of said terpolymer and said third monomer comprises from about 1 to about 5 percent by weight of said terpolymer.

4. The coated or impregnated substrate of claim 3, wherein the substrate is a film selected from the group consisting of cast polypropylene, oriented polypropylene, coextruded film, paper, white opaque film, polyester, high density polyethylene, linear low density polyethylene, cellophane and nylon.

5. The coated substrate of claim 4, wherein the substrate is pre-treated by corona discharge, flame or plasma.

6. The coated or impregnated substrate of claim 5, wherein the cold sealable, adhesive polymer composition contains an additive selected from the group consisting of a wax, corn starch, silica, talc and mixtures thereof.

7. The coated substrate of claim 1, wherein the substrate contains a primer coating.

8. The coated substrate of claim 1, wherein said cold sealable, emulsion polymerized cohesive terpolymer composition further comprises less than about 0.5% by weight of a multifunctional monomer crosslinking agent.

9. A coated or impregnated substrate which includes a cold sealable, emulsion polymerized cohesive terpolymer composition for coating or impregnating said substrate, said terpolymer consisting of:
  (a) from about 40 to about 75 percent by weight of a first monomer selected from the group consisting of ethyl acrylate, hexyl acrylate, isooctyl acrylate, butyl acrylate, methyl acrylate, vinylidene chloride and mixtures thereof;
  (b) from about 15 to about 50 percent by weight of a second monomer selected from the group consisting of vinyl acetate, methyl methacrylate, styrene, ethyl methacrylate, isobutyl methacrylate and mixtures thereof; and,
  (c) from about 0.1 to about 10 percent by weight of a third monomer selected from the group consisting of methacrylic acid, acrylic acid, itaconic acid, sulfoethyl methacrylate, maleic acid and mixtures thereof, whereby said terpolymer coated or impregnated substrate having low tack characteristics, high crimp strength and is cohesive only to substrate which are coated or impregnated with said terpolymer when cold sealed under pressure.

10. The coated or impregnated substrate of claim 9, wherein said terpolymer has an average molecular weight of from about 20,000 to about 150,000 and a glass transition temperature in the range of from about $-15°$ C. to about $15°$ C.

11. The coated or impregnated substrate of claim 10, wherein said first monomer comprises from about 60 to about 70 percent by weight of said terpolymer, said second monomer comprises from about 25 to about 35 percent by weight of said terpolymer and said third monomer comprises from about 1 to about 5 percent by weight of said terpolymer.

12. The coated or impregnated substrate of claim 11, wherein the substrate is a film selected from the group consisting of cast polypropylene, oriented polypropylene, coextruded film, paper, white opaque film, polyester, high density polyethylene, linear low density polyethylene, cellophane and nylon.

13. The coated substrate of claim 12, wherein the substrate is pre-treated by corona discharge, flame or plasma.

14. The coated or impregnated substrate of claim 13, wherein the cold sealable, adhesive polymer composition contains an additive selected from the group consisting of a wax, corn starch, silica, talc and mixtures thereof.

15. The coated substrate of claim 9, wherein the substrate contains a primer coating.

16. The coated substrate of claim 9, wherein said cold sealable, emulsion polymerized cohesive terpolymer composition further comprises less than about 0.5% by weight of a multifunctional monomer crosslinking agent.

* * * * *